Nov. 21, 1950 W. L. KEKO ET AL 2,530,883
METHOD OF PURIFYING PENICILLIN SOLUTIONS
Filed Sept. 13, 1945
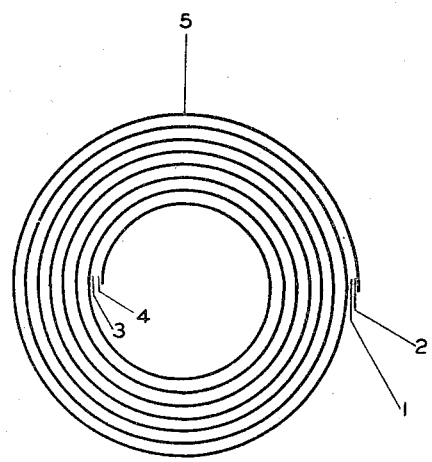
INVENTORS
Wilbur L. Keko
Jerome L. Houston
BY Francis M. Crawford
ATTORNEY Patented Nov. 21, 1950

2,530,883

UNITED STATES PATENT OFFICE 2,530,883

METHOD OF PURIFYING PENICILLIN SOLUTIONS

Wilbur L. Keko and Jerome L. Martin, Terre Haute, Ind., assignors to Commercial Solvents Corporation, Terre Haute, Ind., a corporation of Maryland Application September 13, 1945, Serial No. 616,150

4 Claims. (Cl. 260—302)

This invention relates to a method for effecting a transfer of penicillin material from aqueous acid solutions thereof to water-immiscible liquids and more particularly to so controlling the transfer as to produce a maximum transfer in a limited time.

Penicillin is an antibiotic material produced in extremely small quantities by microorganisms such as *Penicillium notatum, Penicillium chrysogenum* and the like when these organisms are propagated as known in the art on suitable nutrient media usually in aqueous media. The quantities produced are relatively minute as compared to the quantities of the culture liquor so that separation and recovery of the penicillin material from the culture liquor has been a major problem in the preparation of this useful drug.

In many of the recovery processes proposed, advantage is taken of the fact that penicillin in acid solution is considerably more soluble in certain organic solvents than in water, and thus, in the acid solution, it can be transferred from aqueous to organic solvent solution, leaving behind most of the water soluble impurities originally present in the aqueous solution. Such processes of course, necessitate the acidification of the penicillin material, since, as previously indicated, the penicillin material is much less soluble in these organic solvents. Unfortunately penicillin acid is extremely unstable in aqueous acid solution, particularly at the more acid pH values, such that high percentages of the therapeutic activity may be lost by aqueous penicillin solutions upon standing even for short periods, of the order of minutes, at acid pH's suitable for transfer to organic solvents.

Thus, transfer processes involving the acidification of aqueous solutions were limited in their applicability because of the rapid destruction of activity at these acidities, and because of the difficulty of effecting transfer of penicillin in periods of time short enough to obtain substantial recoveries before these recoveries were defeated to a large extent by destruction of activity, even under conditions of refrigeration ordinarily used in connection with this phase of the recovery process.

A further difficulty militating against speedy transfer and recovery of water-immiscible organic solvent extracts was the fact that the impurities associated with the penicillin material are often of the type which promote emulsification resulting in prolonged time for separation with consequent progressive destruction and loss of penicillin activity.

We have now found that penicillin material can be transferred virtually completely from aqueous acid solutions of penicillin material to water-immiscible non-polar organic solvents therefor at ordinary room temperatures or above, in accordance with our invention wherein the time during which the penicillin acid must exist in aqueous solution in which it is unstable, is so effectively limited that virtually no destruction of penicillin activity takes place, and substantially all the available penicillin material previously present in the aqueous solution is transferred to the non-polar organic solvent solution in which it is much more stable than in aqueous solution.

In other words, it is possible to effect a transfer of penicillin material from aqueous solutions to water-immiscible solvents by solvent extraction of the aqueous medium with the water-immiscible non-polar solvent. This method, as previously practiced in penicillin recovery processes is unsatisfactory because of the length of time during which much of the penicillin must exist in aqueous solution before it can be transferred to the more stable medium of the organic solvent. This is particularly true where penicillin material is produced on a large scale, for example in huge tanks holding many thousands of gallons of culture liquor, and where large quantities of aqueous, penicillin-material-containing solutions must be acidified and subjected to expensive refrigeration and to time consuming multiple extraction steps, during which time a significant proportion of the penicillin activity is lost.

As illustrative of the rapid destruction of penicillin activity, it has been determined that the so-called half life period of pure penicillin G in aqueous solution at pH 2 and a temperature of 24° C. is 12.5 minutes and at pH 3, and 24° C. is 17 minutes, which means that an aqueous solution of penicillin, standing under the conditions described, loses 50% of its activity in the time mentioned. These figures relate to pure penicillin material and, the rapidity of loss of activity is even greater for the more impure solutions of the different forms of penicillin which exist during the various recovery steps. For example, the half-life of a penicillin beer from a lactose-steep water mash has been found to be of the order of 5–10 minutes at a pH of 2.0 and at a pH of 1.5 it was considerably less. Accordingly, appreciable destruction of the penicillin took place within the first minute after the pH was reduced to this value. In general, the lower the pH value the higher the distribution ratios of penicillin with respect to water and water-immiscible organic solvents. A pH of at least as low as 3 appears to be necessary for effective transfer of penicillin from water to solvent and, in general, the lower the pH the more rapidly the extraction can be completed but because of the increased rate of penicillin destruction at such pH ranges, more rapid extraction is essential.

Although the desirability of effecting rapid penicillin transfer at low pH values has been recognized for some time, it has never been possible as far as we are aware to effect the necessary multi-stage extraction and separation steps in the limited period necessary to avoid substantial loss of penicillin activity.

In carrying out our invention we effect this limitation of time, etc., by passing in thin streams the aqueous acid solution of penicillin material in intimate surface contact with, and counter-current to, a thin stream of water-immiscible non-polar organic liquid penicillin solvent, while applying force to said streams of such character as to maintain the common surfaces of the counter-current liquid streams, in intimate contact with each other, while concomitantly maintaining the bulk of said streams as separate, homogeneous flowing masses, and limiting the time of contact between said streams to a period insufficient to effect an appreciable loss of penicillin activity.

The procedure described may be effected in any desired manner and with the aid of any suitable equipment such as that shown in the accompanying diagram. It is understood, however, that this equipment may be modified in various ways and should not be regarded as limiting in character. A suitable manner of achieving the contact and conditions, etc., described involves passing the two thin streams counter-surrent to each other through a long narrow confined spiral passageway, the turns of the spiral being narrowly spaced apart. The aqueous penicillin material solution to be extracted is acidified and then passed in one direction along one wall 4 of the spiral shown in the accompanying diagram, and the water-immiscible non-polar organic solvent extractant passed along the other wall 2 of the spiral in the opposite direction from the water solution of penicillin material. The spiral 5 may be rotated at a speed sufficient to afford a centrifugal force adequate to maintain the surface areas of the counter-current streams in intimate contact, while maintaining the bulk of the streams separated in consequence of their different specific gravities, so as to reduce emulsification and the like difficulties. Pressure, if required, may be maintained on the feeding portion of the respective streams, the rate of flow of the respective liquids regulated as desired, and the entire operation may be carried out in a closed system.

The spiral should either be of sufficient length such that the contact effected between the two streams is at least sufficient to effect a transfer of penicillin material to non-polar organic solvent solution equivalent to the number of extraction stages required to effect the desired recovery of the penicillin material in the non-polar organic solvent solution, preferably such as to effect substantially complete recovery, or the rate of flow thru the spiral should be regulated so as to give the desired number of stages in a given length. The length of the passage, and other conditions are regulated so that the time elapsed before transfer of the major portion of the penicillin material from the aqueous acid medium in which it is unstable, to the water-immiscible non-polar organic solvent medium in which it is relatively stable, will be at a minimum, and such that virtually no significant destruction of penicillin activity occurs due to the time factor under these conditions.

The completeness of recovery of the penicillin material, i. e., its transfer from aqueous acid solution to water-immiscible non-polar solvent solution, is governed by such factors as the initial activity or potency concentration of penicillin material in the original aqueous solution, the volume ratio of original aqueous penicillin solution and of water-immiscible non-polar solvent, the distribution coefficient of the penicillin material between water and the water-immiscible non-polar liquid, and the number of stages.

In order to effect substantially complete transfer of penicillin material to the non-polar organic solvent solution we have found that it is desirable to use a water-immiscible non-polar solvent extraction in which the solvent to water distribution coefficient of penicillin is at least about 10 to 1, and to conduct the extraction so that at least the equivalent of about 3 extraction stages is effected.

After the counter-current streams of liquids have passed through the contacting means such as the spiral passageway, the water and solvent phases may be substantially completely separated by any desired means, for example by discharging the streams from the narrow confined passageway into a relatively much wider space and continuing to apply centrifugal force sufficient to effect the desired separation. The streams may then be separately discharged and further treated as desired.

In carrying out penicillin transfer according to our invention, it is unnecessary to cool or refrigerate the aqueous penicillin solution, since acidification may be effected immediately prior to contacting the water solution with the water-immiscible solvent solution, for example, by adding the required acid to the flowing stream of aqueous penicillin solution, immediately prior to its entry into the contacting passageway, so that the total time of contact of penicillin material with aqueous acid solution is so limited that virtually no destruction of penicillin activity takes place. Under the conditions described, of intimate surface contact of the counter-current streams, the major proportion of the penicillin material is transferred almost instantly to the organic solvent phase. For example, using amyl acetate, in which the penicillin distribution ratio with respect to amyl acetate-water at low pH values is such that the greater portion of the penicillin material transfers virtually instantaneously to the amyl acetate in the equivalent of a single stage extraction and is safe from further destructive action of the aqueous acid. As the streams continue to contact each other, further extraction stages are effected as to the remaining penicillin in aqueous solution, until, after the equivalent of several extraction stages, practically all of the penicillin has been transferred.

As brought out above, the so-called "half-life" period of penicillin in aqueous acid solution is relatively short and with certain terms and in some menstrua is a matter of minutes, so that the limitation of time of contact effected by our process results in virtually complete prevention of destruction of the penicillin activity present. Under the conditions employed in our process, the total elapsed time during which the streams will be in contact will usually be no more than about 1 to 3, and preferably 1 to 1½ minutes and much of the penicillin material, as brought out above, has been transferred to stable and safe conditions in the solvent phase within a matter of seconds, and thus the major part of the penicillin activity is immediately rendered safe from destruction.

Solvents suitable for use as extractants in our process, are any water-immiscible non-polar organic liquids in which the distribution ratio of penicillin material between solvent and water is sufficiently high under the conditions employed, and we have found that for best results, the distribution ratio should be at least about 15 to 1 as measured at 0° C. and pH of 2.6. As illustrative of suitable solvents a number are listed below, together with the distribution ratios of penicillin with respect to the proportion of penicillin to water found by assay in the respective phases.

TABLE I

Solvents and distribution ratios

| Solvent | Distribution ratio of Penicillin Solvent to Water at 0° C. and a pH of 2.6 |
| --- | --- |
| Iso-propyl acetate | 67:1 |
| n-butyl acetate | 35:1 |
| Amyl acetate | 39:1 |
| Chloroform | 37:1 |
| Ethyl ether | 14:1 |
| Methylisobutylketone | 39:1 |

The ratio of the quantity of solvent to penicillin solution utilized for extraction, will vary somewhat with a number of factors such as the distribution ratio of the particular solvent, the length of the counter-current contacting passage, the speed of flow, the volume concentration to be effected and the like. In general, the quantity of solvent will be considerably less than the quantity of aqueous penicillin-containing solution, for example in a ratio of between about 10 to 1 and 5 to 1 of aqueous solution to solvent.

The extraction may be carried out on aqueous solutions of penicillin material at any stage in the recovery of this material from impure aqueous solutions thereof. Thus the extraction may be carried out directly on the clarified culture liquor or "beer,' or on solutions which have been subjected to preliminary purification, for example by adsorption of the penicillin activity on active carbon, elution thereof with a water-miscible solvent, and evaporation of the eluate to remove water-miscible solvent leaving the penicillin material in a partially purified state in aqueous solution. Or our process may be applied to the recovery of rejected batches of relatively pure or concentrated penicillin materials which have been stored beyond the permissible time period or which for one reason or another it is desirable to reprocess. In fact, our process is applicable to recovery of any aqueous solution of penicillin material over a wide range of dilutions and concentrations, from the most dilute and impure culture liquors, to the most concentrated, or approximately pure solutions of penicillin material.

The following specific examples will further illustrate our invention.

EXAMPLE I

The extractions in this experiment were carried out in a machine known as the No. 6000 Podbielniak Centrifugal Solvent Extractor. The machine consists of a cradle assembly which rotates on large diameter hollow shaft stubs. The cradle houses a fractionating rotor such as that shown in Figure 1, whose internal construction consists essentially of a spirally wound stainless steel strip held edgewise between circular head plates and the two hollow shaft ends with means for introducing, discharging, and sealing the liquids. The spiral strip which forms the counter-current extraction passageway is 160 feet long and 4 inches wide with 12 turns to the inch. The first turn of the spiral begins approximately 2 inches out from the axis of rotation, leaving a clear space 4 inches in diameter at the center of the rotor. The clearance between successive turns of the spiral is approximately .007 inch.

In conducting the extractions, clarified culture liquor, from which the mycelium had been removed, and assaying about 50-70 Oxford units of penicillin activity per ml. was used, and was extracted by amyl acetate as the solvent.

The machine was started rotating and allowed to reach its full speed of about 2,000 revolutions per minute before any liquids were pumped into it. Then the solvent feed was started, entering the peripheral entrance 2 and the machine was allowed to run until the rotor was completely filled with solvent, and the solvent started to discharge at the axial outlet 3. The flow of solvent was then set at the desired rate of up to about 0.30 gallon per minute or more.

The clarified culture liquor was then introduced into the axial inlet 4 under pressure, and as the stream of culture liquor was introduced, sufficient phosphoric or other acid was introduced into the stream to bring the pH of the solution to pH 2.0 to 2.5. After equilibrium had been reached, i. e., after spent culture liquor began to discharge from the peripheral outlet 1 and penicillin-containing solvent was discharged from the axial outlet 3 the desired flow rates as indicated in the table were maintained throughout the runs. Extraction conditions and results on a number of runs are tabulated in the table below.

TABLE

Extraction of filtered beer with amyl acetate

| Incoming Beer | | Conditions | | | Amyl acet. Assay, o.u./ml.[1] | Yield,[2] Per Cent | Spent Beer, o.u./ml[1] | Mat[3] Bal, Per Cent |
| --- | --- | --- | --- | --- | --- | --- | --- | --- |
| Gal. | Assay, o.u./ml.[1] | Ratio, beer/amyl acetates | Rate, gal./hr. | | | | | |
| 33.0 | 57 | 5/1 | 60 | | 295 | 105 | 2 | 109 |
| 32.0 | 63 | 5/1 | 60 | | 293 | 99.2 | 0 | 99.2 |
| 25.0 | 70 | 8/1 | 50 | | 597 | 98.3 | 0 | 98.3 |
| 35 | 56 | 8/1 | 60 | | 456 | 100 | 1 | 102 |
| 40 | 70 | 10/1 | 60 | | 685 | 101 | 1 | 102.5 |
| 37 | 70 | 9/1 | 60 | | 525 | 88.8 | 4 | 96.3 |
| 35 | 53 | 9/1 | 60 | | 468 | 104 | 2 | 108.5 |

[1] Oxford units penicillin per ml.

[2] By percentage yield is meant $\frac{\text{Total amount of penicillin in Amyl acetate}}{\text{Total amount of penicillin in beer}} \times 100\%$

[3] By percentage material balance is meant
$\frac{\text{Total amount of penicillin in amyl acetate} + \text{total amount penicillin in spent beer}}{\text{Total amount of penicillin original beer}} \times 100\%$

EXAMPLE II

The extractions illustrated in this example were carried out in the machine described under Example I, and according to the procedure there described.

The aqueous penicillin solution, instead of being clarified culture liquor, was a partially purified aqueous solution resulting from the steps of adsorbing the penicillin material from the culture liquor on active carbon, eluting the carbon with an aqueous acetone solution, and evaporating the acetone, leaving the penicillin material in aqueous solution along with certain other impurities.

The conditions and results of a number of such runs are tabulated in the table below.

TABLE
*Extraction of evaporate with amyl acetate*

| Incoming Evap. Conditions | | | | Acet. Assay, o. u./ml. | Yield, Per Cent | Potency, o. u./mg. | Spent Evap., o. u./ml. | Mat. Bal., Per Cent |
|---|---|---|---|---|---|---|---|---|
| Gal. | Assay, o. u./ml. | Ratio, beer/acet. | Rate, gal./hr. | | | | | |
| 90 | 919 | 6/1 | 60 | 5,800 | 105 | 580 | 33 | 109 |
| 91 | 793 | 5/1 | 100 | 4,750 | 108.5 | 480 | 36 | 113 |
| 87 | 824 | 9/1 | 60 | 5,940 | 82.0 | ------ | 35 | 86.0 |
| 450 | 746 | 5/1 | 90 | 5,020 | 121 | 570 | 43 | 129 |
| 440 | 660 | 5/1 | 90 | 2,710 | 94 | 500 | 42 | 101 |
| 415 | 659 | 7/1 | 90 | 6,143 | 105 | 610 | 96 | 116 |
| 91 | 778 | 10/1 | 90 | 6,380 | 85 | 485 | 85 | 96.5 |
| 90 | 580 | 10/1 | 60 | 5,440 | 98.5 | 480 | 36 | 105 |
| 81 | 892 | 6/1 | 120 | 4,888 | 105 | 495 | 53 | 111 |
| 90 | 868 | 6/1 | 110 | 5,850 | 113 | 470 | 87 | 123 |
| 80 | 810 | 6/1 | 100 | 5,100 | 106 | 455 | 83 | 117 |
| 90 | 692 | 5/1 | 115 | 3,375 | 93.4 | 350 | 67 | 102.8 |

EXAMPLE III

The extractions illustrated in this example were likewise carried out in the equipment described in Example I.

In the runs described in the table below the aqueous penicillin solution was derived from a batch of rejected penicillin-calcium which on solution exhibited a slight turbidity which caused its rejection. This calcium salt was diluted with tap water to a potency concentration of about 2,000 Oxford units of penicillin activity per milliliter, and extracted with amyl acetate under the conditions and with the results listed in the table below.

TABLE
*Extraction of reworked calcium penicillin with amyl acetate*

| Incoming Solution | | Conditions | | Acetate Out | | | | Spent Acetate, o. u./ml. | Mat. Bal., Percent | Water Extract | | Overall Yield, Percent |
|---|---|---|---|---|---|---|---|---|---|---|---|---|
| Amt., gal. | Units, mm. | Ratio, sol./acet. | Rate, gal./hr. | Assay, o. u./ml. | Total Units, mm. | Potency, o. u./mg. | Yield, Percent | | | Total Units, mm. | Potency, o. u./mg. | |
| 107 | 782 | 3/1 | 40 | 4,400 | 789 | ------ | 101 | 73 | 103.5 | 693 | ------ | 88.5 |
| 181 | 1,107 | 4/1 | 50 | 5,760 | 976 | ------ | 88.4 | 111 | 95 | 964 | ------ | 87.0 |
| 165 | 761 | 3.5/1 | 40 | 4,075 | 768 | 703 | 95.4 | 70 | 101 | 753 | 553 | 99.0 |
| 118 | 569 | 3.5/1 | 50 | 6,700 | 832 | 905 | 146 | 0 | 146 | 708 | 710 | 124.5 |
| 170 | 1,605 | 5/1 | 50 | 6,640 | 930 | 720 | 57.6 | 79 | 69 | 1,084 | ------ | 67.7 |
| 122 | 897 | 5/1 | 60 | 7,945 | 861 | 580 | 96.0 | 31 | 97.5 | 842 | 532 | 94.0 |
| Totals 863 | 5,721 | ------ | ------ | ------ | 5,156 | ------ | 90.1 | ------ | ------ | 5,044 | 598 | 88.2 |

While the above description points out the preferred embodiments of our invention, it will be understood that departures may be made in the use of equipment and conditions and the like, for effecting the various procedural steps, within the scope of the specification and claims.

What is claimed is:

1. A method for effecting a rapid multi-stage equilibrium transfer of penicillin material from aqueous acid solutions thereof to organic, water-immiscible liquid non-polar solvents, in a limited period such that appreciable destruction of penicillin activity is avoided, which comprises passing in thin streams an aqueous acid solution of penicillin material in intimate surface contact with, and counter-current to a thin stream of an organic water-immiscible non-polar liquid penicillin solvent while applying force to said streams of such character as to maintain the common surfaces of the counter-current liquid streams in intimate contact with each other while concomitantly maintaining the bulk of said streams as separate homogeneous flowing masses, and limiting the time of contact between the said streams to a period insufficient to effect an appreciable loss of penicillin activity.

2. A method for effecting a rapid multi-stage equilibrium transfer of penicillin material from aqueous acid solutions thereof to organic, water-immiscible liquid solvents, in a limited period such that appreciable destruction of penicillin activity is avoided, which comprises passing in thin streams an aqueous, acid solution of penicillin material in intimate surface contact with, and counter-current to a thin stream of an organic water-immiscible liquid penicillin solvent, while applying force to said streams of such character as to maintain the common surfaces of the counter-current liquid streams in intimate contact with each other while concomitantly maintaining the bulk of said streams as separate homogeneous flowing masses, and limiting the time of contact between the said streams to a period of less than 3 minutes.

3. A method for effecting a rapid multi-stage equilibrium transfer of penicillin material from acqueous acid solutions thereof to organic, water-immiscible liquid solvents, in a limited period such that appreciable destruction of penicillin activity is avoided, which comprises passing an aqueous acid solution of penicillin material at a pH between about 2 and 2.5, and a water-immiscible non-polar solvent having a solvent to water distribution ratio with respect to penicillin, greater than about 10:1 in narrow streams counter-current to, in intimate surface contact with each other, while concomitantly maintaining the bulk of said streams as separate homogeneous flowing masses while limiting the time of contact between the said streams to a period of less than 3 minutes.

4. A method for effecting a rapid multi-stage equilibrium transfer of penicillin material from aqueous solutions thereof to organic, water-immiscible liquid non-polar solvents, in a limited period such that appreciable destruction of penicillin activity is avoided, which comprises supplying an acid aqueous solution of penicillin material to the axial outlet in a rotatable spiral passageway, rotating said passageway to secure by centrifugal action an outwardly propelling force to propel said solution of penicillin material outwardly through said passageway, supplying to the peripheral outlet an organic water-immiscible non-polar liquid penicillin solvent under pressures sufficient to force it inwardly through the said passageway to the axial outlet thereof in counter-current contact with said solution of penicillin material while concomitantly maintaining the bulk of said streams as separate homogeneous flowing masses, and recovering the penicillin in said solvent.

WILBUR L. KEKO.
JEROME L. MARTIN.

REFERENCES CITED

The following references are of record in the file of this patent:

UNITED STATES PATENTS

| Number | Name | Date |
|---|---|---|
| 2,271,684 | Dons et al. | Feb. 3, 1942 |

OTHER REFERENCES

Lancet: Aug. 14, 1941, pp. 177–180.
Abraham: British Journal of Exp. Pathology, vol. 23, page 104, June 1942.
Penicillin and Other Antibiotic Agents, by Herrell, page 18 (1945).